(12) United States Patent
Van Heghe et al.

(10) Patent No.: US 7,209,914 B2
(45) Date of Patent: Apr. 24, 2007

(54) METHOD OF STORING, RETRIEVING AND VIEWING DATA

(75) Inventors: Hans Van Heghe, Hever (BE); Erik Willemse, Mechelen (BE)

(73) Assignee: ICMS Group N.V. (BE)

( * ) Notice: Subject to any disclaimer, the term of this patent is extended or adjusted under 35 U.S.C. 154(b) by 233 days.

(21) Appl. No.: 10/154,234

(22) Filed: May 21, 2002

(65) Prior Publication Data

US 2003/0014429 A1    Jan. 16, 2003

Related U.S. Application Data

(60) Provisional application No. 60/292,823, filed on May 22, 2001.

(51) Int. Cl.
*G06F 7/00* (2006.01)
(52) U.S. Cl. .................. 707/3; 707/4; 707/5; 707/102; 707/104.1
(58) Field of Classification Search ............... 707/3, 707/4, 5, 102, 104.1
See application file for complete search history.

(56) References Cited

U.S. PATENT DOCUMENTS

| | | |
|---|---|---|
| 5,542,024 A | 7/1996 | Balint et al. |
| 5,682,330 A | 10/1997 | Seaman et al. |
| 5,787,234 A | 7/1998 | Molloy |
| 5,799,311 A * | 8/1998 | Agrawal et al. ............ 707/102 |
| 5,930,783 A | 7/1999 | Li et al. |
| 6,073,130 A * | 6/2000 | Jacobson et al. ............... 707/5 |
| 6,138,119 A * | 10/2000 | Hall et al. ...................... 707/9 |
| 6,167,406 A | 12/2000 | Hoskins et al. |
| 6,169,992 B1 * | 1/2001 | Beall et al. ............. 707/103 R |
| 6,173,284 B1 * | 1/2001 | Brown ......................... 707/10 |
| 6,324,551 B1 * | 11/2001 | Lamping et al. ............ 715/500 |
| 6,341,280 B1 * | 1/2002 | Glass et al. .................... 707/3 |
| 6,415,283 B1 * | 7/2002 | Conklin ......................... 707/3 |
| 6,754,631 B1 * | 6/2004 | Din ............................ 704/270 |

FOREIGN PATENT DOCUMENTS

| | | |
|---|---|---|
| EP | 1 003 110 A | 5/2000 |
| JP | 8305719 | 11/1996 |
| JP | 9222852 | 8/1997 |
| JP | 2000268090 | 9/2000 |
| WO | WO 95/02221 A | 1/1995 |
| WO | WO 99/19816 A | 4/1999 |
| WO | WO 00/46651 | 8/2000 |
| WO | WO 00/51021 A | 8/2000 |
| WO | WO 01/08053 | 2/2001 |

\* cited by examiner

*Primary Examiner*—Hung Pham
(74) *Attorney, Agent, or Firm*—Knobbe Martens Olson & Bear, LLP (57) ABSTRACT

A method of storing data in a database organizes the data in electronic objects and enriches the objects with 'cognitive elements'. These elements allow a search of objects in the database which is similar to the human thinking process. One or more cognitive elements may be selected, leading to a list of objects with a relevance score based on the number of cognitive elements found for each object in the list. Computer programs allow to create such a database, to retrieve information from it, and to view information contained in it.

4 Claims, 8 Drawing Sheets

| MI | MK | Keywords |

| | |
|---|---|
| Skeleton | Skeleton1 |
| Name | Datasheet Product1 |
| Expiration date | 2002-12-31 |
| Description | Description for Datasheet Product1 |

FIG. 4a

| MI | MK | Keywords |

AutoDetect

| Property | Value |
|---|---|
| Department | Marketing |
| DocumentType | Datasheet |
| Language | English |
| Product1 | |
| | Product0 |
| | Product1 |
| | Product2 |
| | Product3 |

```
☐ Top results (3)
    📄 Product3 datasheet EN (for print)(100%)
    📄 Product3 datasheet EN (for web)(100%)
    📄 Add-ons for Product3 (67%)
⊞ + 65% (0)
⊞ - 65% (140)
```

METHOD OF STORING, RETRIEVING AND VIEWING DATA

CROSS-REFERENCE TO RELATED APPLICATION

This application claims priority based on French Patent Application No. 01 07056, filed on May 30, 2001.

This application claims the benefit of the filing date of U.S. Application No. 60/292,823 filed on May 22, 2001, under 35 U.S.C. § 119(e).

BACKGROUND OF THE INVENTION

1. Field of the Invention

The present invention is related to a method for storing information in a database, as well as to methods for retrieving and viewing this data. The invention is equally related to computer programs for performing these methods.

2. Description of the Related Technology

In most computer storage systems, documents are stored in a tree-like structure, comprising folders, sub-folders, and documents stored in each folder. The search for specific information in such a structure is acknowledged as being very ineffective and time-consuming. Most document management applications provide so-called full-text search capabilities. What these applications do is to compile a list of all the words of all the documents in the system. When looking for information, e.g. by a search or browse operation, specific key words have to be entered by the user, and a program will search the storage system for these words. The result will be a list of all the documents in which these words were found.

The problem however with this kind of search is that it is not really refined. The result may be a very large list of documents, all containing one or more of the given key words. Furthermore, the level or relevance of each document is not indicated, so that the search amongst the documents of the resulting list becomes difficult.

Also, this type of search is limited to text files, and cannot be used for other types of information, such as graphics, pictures or video. These latter data can only be searched by looking for the right file extensions for example and by going through the tree structure, in the hope that they have been stored in an appropriately named folder or subfolder or under an appropriate filename, which may or may not allow the user to find the desired information.

SUMMARY OF CERTAIN INVENTIVE ASPECTS

In accordance with an inventive aspect, a method for storing, retrieving and viewing data in a computer storage system allows a fast and effective retrieval of desired information by the user, regardless of the type of document wherein the information was stored.

In one embodiment, a method for creating an electronic database includes defining a list of cognitive properties, which are potentially relevant to all the objects which are to be saved in the database, providing a repository of electronic memory, in which to save objects (text files, pictures, sound files, etc . . . ), providing at least one object, preferably an electronic file, attributing for the object, a value to each cognitive property in the list, thereby creating a list of cognitive elements for the object, attaching the list of cognitive elements to the object, saving the object into the database, so that all objects in the database, enriched with at least the cognitive elements, are stored in a non-hierarchical group of objects, in the repository of electronic memory.

In a further embodiment, a method further preferably includes an act of providing a list of optional values for each cognitive property.

In another embodiment, the method may further include the act of providing definitions of the cognitive properties, and of the optional values.

The method may further include the act of attributing a weight factor to at least one combination of a given cognitive property and a given value for the property.

Further, in one embodiment, the method may further comprise the step of automatically creating at least one Meta Information element, and attaching the MI-element to the object.

Another embodiment is related to a method for retrieving objects from a database which has been created by the method described earlier, the method for retrieving including selecting one or more cognitive properties in relation to the database, attributing a value to each of the cognitive properties which were selected, thereby defining a number of desired cognitive elements, receiving a group of documents, which are equipped with all or a part of the desired cognitive elements.

The documents of the group may be listed in order of relevance, the relevance being based at least on the number of desired cognitive elements attached to the documents in the group. The relevance may further be based on a weight factor, attributed to at least one cognitive element.

In the method for retrieving objects, objects may be displayed in a tree structure, allowing an overview of the consecutive cognitive elements desired by the user, and wherein the tree structure comprises folders and subfolders, every (sub)folder being related to a cognitive element.

The tree structure may be further defined by a filter, the filter defining one or more cognitive elements to be excluded from the tree structure.

According to an embodiment of the method for retrieving objects, the acts of selecting cognitive properties and attributing values, thereby forming desired cognitive elements are done by selecting one object, and by searching other objects with all or a part of the cognitive elements attached to the one object.

According to another embodiment, the method for retrieving objects, based on a well defined number of cognitive elements, is performed at regular intervals, and the result list is limited to objects which have entered the database in a recent and well defined time span.

A further embodiment is related to a computer program comprising program code means for applying the methods described herein. The invention is equally related to a computer program comprising program code means stored on a computer readable medium, for applying the methods described herein, when the program is run on a computer.

DETAILED DESCRIPTION OF CERTAIN INVENTIVE EMBODIMENTS

One embodiment of the invention relates to method of storing, retrieving and viewing information stored in a computer storage medium, further called the storage system or database, and another embodiment relates to a method of configuring this database. The methods as such will be described in detail. First of all, however, the common principle behind these methods will be explained. According to one embodiment, electronic knowledge objects such as text documents, photos, video, slides, etc, are no longer stored in a tree-like structure, but in a large 'pool' of objects. The objects are not stored in folders and subfolders, but 'side by side', in this large pool, which can be imagined as one main folder. This pool is the database. In this database, every knowledge object is enriched with a number of labels, which are designed to make the user distinguish between objects in the database. A knowledge object can be an electronic object of every kind (text, graphic, sound, etc.), a record, or any other information object.

Adding labels to such an object is not a novelty. In classical databases, a file is saved along with additional info, such as the filename, save date, the size of the file, name of the author, etc. In the case of text files, keyword lists are also generated for each document or for a group of documents.

What is specific, besides the pool-like like database structure, is the addition of labels which are defined as 'cognitive elements' to each knowledge object in the pool. The content of such cognitive elements goes beyond the limited capabilities of keywords, or other automatically attributed labels to a given object. Cognitive elements refer to categories to which objects belong, on the basis of their content. For example, a number of text files in the database may be written in English. According to one embodiment of the method, these files will receive a labile containing characterizing information in the style of 'language=English'. Furthermore, the document may be a sales report, in which case a second labile will contain 'type of document=sales report'. Any number of cognitive elements may be added to form a list of cognitive elements, attached to every object in the pool. It is clear that the definition of such cognitive elements cannot always take place automatically. Most of these elements have to be entered manually by the user, for example the author of a file, or the person responsible for the maintenance of a particular database. If they are automatically assigned, they will need to be verified by the user.

Retrieval of information from such a pool of objects makes use of the labels attached to the objects. This process of finding information is very similar to the way the human mind looks for information stored in the brain. Through instant association, humans tend to look through a plurality of categories of information. When trying to remember the name of a person, one will pass through the almost subconscious list of questions and answers, which may take on the following form:

Is the person male of female? Male

Did he and I study at university together? yes

Does he have dark hair or not? dark hair

What is his name? John Smith!

End of search.

The corresponding cognitive process takes place when we register information. The information itself may be merely 'John Smith', but we don't simply store these words in a given memory location. We store it along with a list of attributes which allow us to find it back, if needed. The list of attributes therefore forms a cognitive 'map', which leads the way quickly and effectively to the information we want.

Figures 1A, 1B:
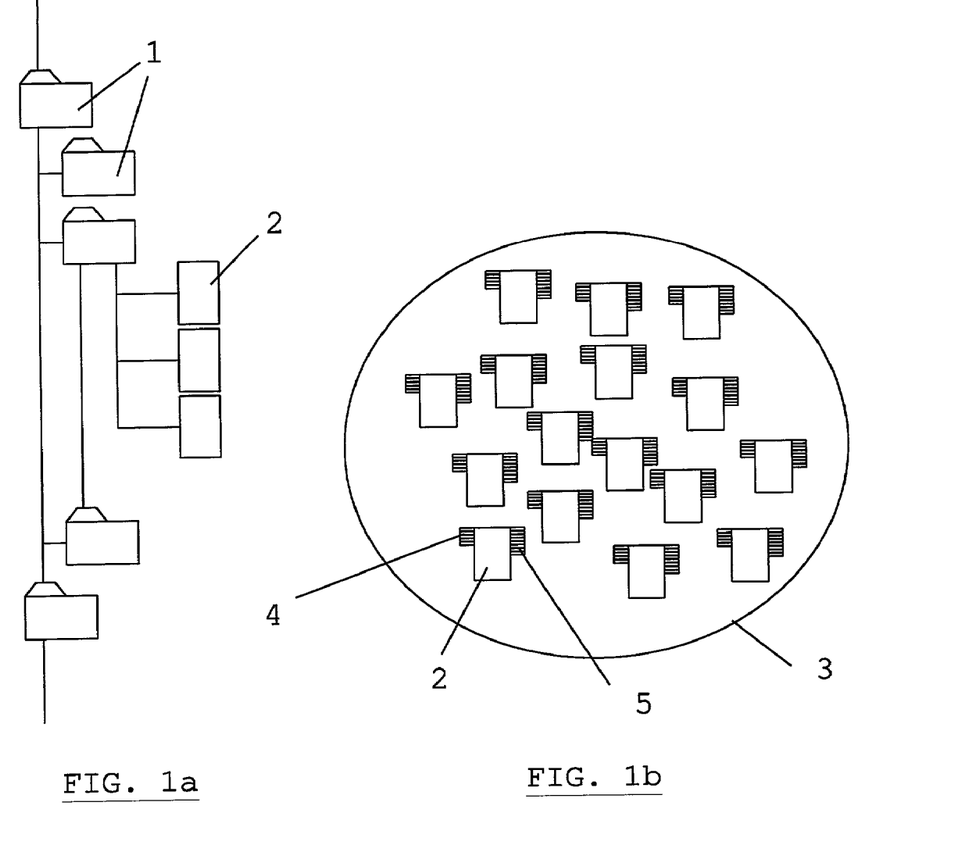
FIG. 1 represents a schematic comparison between a classic storage system, and one embodiment of a storage system created by the methods described herein.

The inventive embodiments make use of the same process for storing objects in the database and retrieving objects from it. FIG. 1 shows a schematic comparison of the classical tree structure with folders and subfolders 1 and objects (in most cases files) 2 on the one hand, with the pool structure 3 on the other. Each object 2 is equipped with labels 4 and 5. Each of these labels is related to a characteristic of the object concerned. A first group 4 of labels is called 'Meta Information (MI)' labels. These can be defined as labels which can be created automatically by the computer system, on the basis of the object itself. Some of these labels are used in current day storage systems: file size, save date, automatically compiled list of key words, etc. These labels are known in the art, and are mostly created automatically on the basis of the document in question. The labels 5 represent the so called 'Meta Knowledge (MK)' labels, which are characteristic to one embodiment, and which comprise information about the contents of an object, for example about the subject of a text file. These are the labels which are related to language or type of file, as described above. MK-elements may be created automatically in certain given circumstances, but they are mostly attributed manually, or at least checked and possibly modified, by the user. In the database, each object is enriched with a number of MI and MK elements, as shown in FIG. 1b, and saved as such in a pool of documents 3. Hereafter, methods and computer programs will be described to create such a database, and to retrieve and represent information contained in such a database.

To complete the specific terminology of this description, the content of the objects is the actual Information content (I). The combination of information content (I), Meta Knowledge (MK) and Meta Information (MI) forms the basis of the Computer Sensible Knowledge model (CSK).

The CSK model is related to methods of which the principle was described above and to computer programs allowing the performing of these methods.

First of all, one embodiment of a method is described for configuring a database. This configuration comprises the basic step of defining a number of cognitive properties, which are related to the database to be created. These properties depend strongly on the origin of the objects that are likely to enter a specific database, i.e. where were they created, to what type of company or person do they belong, are they all related to a certain subject, are they all in one language, etc. This first step needs to be done by one or more persons, preferably by a system administrator. In the preferred case, this step is followed by the compilation of a list of optional values for every cognitive property, so that the user may choose from the list.

In creating databases for businesses, the following cognitive properties will probably have to be created:
Language
Document type
Competence level
Type of audience
Market segment For the property 'language', a number of values may then be defined English, French, Dutch, Spanish, etc. . . . The same is done for the other properties.

Also in the preferred case, an additional step is to provide definitions of the cognitive properties and of their optional values. This is necessary in order to create a shared understanding of terms, so that they are comprehended by all people who use the methods. This is preferably a group of people who share the same workspace or at least the same occupation or interest. The efficiency of the methods and programs described herein depends on the uniformity of the terminology used and the degree of understanding and agreement of this terminology on the part of the users. Specific training in this respect may be necessary.

The MI-properties must also be configured for the documents in the database. This is basically a step which is similar to the configuration of existing computer storage systems. It concerns elements of information which can be generated automatically by the computer system, on the basis of the document, as soon as it is created, or saved. Examples of such MI-elements are: file size, author name, save date, key word list, etc. . . .

It should be understood that cognitive properties may also be created automatically by a suitable computer application, adapted to certain types of template documents. For example, a text document of a pre-defined format may contain a number of cognitive properties in its title, which may then be derived automatically from such a text document. A clear distinction is made however: cognitive properties are related to the contents of a document, while MI-elements are generally related to aspects of a document which are not content-related (an exception to this may be the key word list). In practice, most cognitive elements will need to be attributed manually by the user, or at least checked and possibly modified. MI-elements are created by the system, and generally remain untouched by the user. As explained further, the cognitive elements have a specific format, and form the basis of the method for searching information in the database. The MI-elements do not perform a function that goes beyond that which is known today.

Figure 2A:
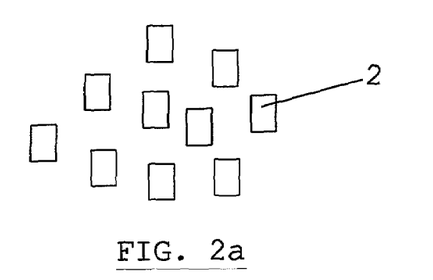
FIG. 2 represents schematically one embodiment of the method for creating a storage system.

The starting point in the method for actually creating the database, is a group of objects, as shown in FIG. 2a. These objects have no labels whatsoever, and are only characterized by their information content (I). They may be any type of electronic object: text file, picture, video, etc. . . . They now need to be put into a cognitive database.

Figure 2B:
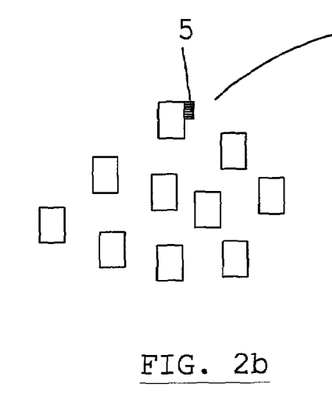

The user of the database will now take each object, and attribute a value to each cognitive property in the list, the value being particular to that object. One particular object may then for example receive the following list of cognitive elements:
Language=English
Type of document=technical report
Competence level=expert
Type of audience=car industry
Market segment=sports cars
Etc As seen in FIG. 2b, the objects in the database are now enriched with the labels 5, corresponding to cognitive elements as described above (e.g. 'language=English'). The list of cognitive elements (MK elements) is not hierarchical; every cognitive element stands by itself, independently of other elements related to a particular object. It is also not required that every object possesses a cognitive element for every cognitive property of the database. One object in the database may have more cognitive elements than another. Preferably, however, a value needs to be attributed to a fixed number of properties. If one or more properties should not be defined for a particular object, these properties should receive the value 'undefined'.

Figure 2C:
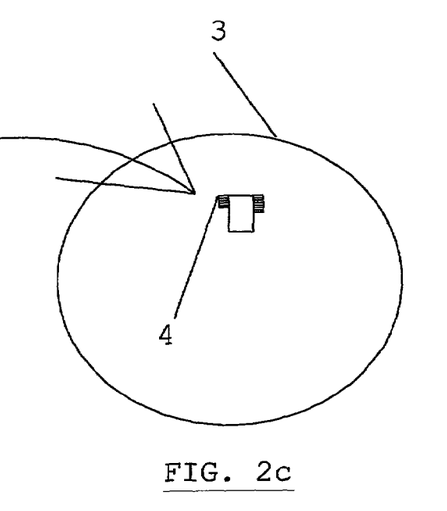

The object may then be saved into the database 3 (FIG. 2c), which may be imagined as one folder (the 'pool' mentioned above) of a classic tree structure. The database can thus be imagined as a large pool of objects, which are stored 'side by side', i.e. without any hierarchical classification.

Figure 2D:
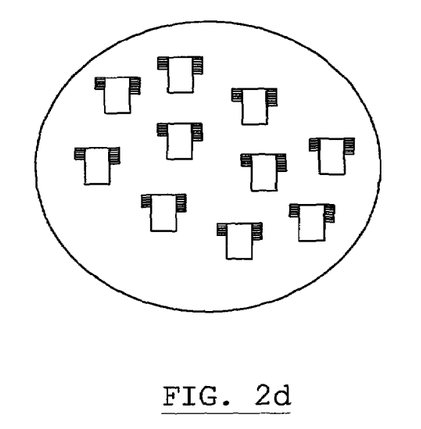

The computer system creates the MI-elements 4, which it can derive from the object itself: save date, author (when entered in a prescribed way into the document), object size, etc, as well as a list of key words. As a result, the database is created (FIG. 2d).

According to a preferred embodiment, the key word list may also be chosen manually by the user. This is better than the automatic creation of the list of all words in a text. A limited key word list may be added in this way, comprising only those words which are likely to be entered by someone searching the document. Such a key word list may also comprise words which are not literally in the text, but are strongly affiliated to the document content.

To summarize, the method of configuring a database and adding an object to the database includes, in one embodiment, defining a list of cognitive properties, which are potentially relevant to all the objects which are to be saved in the database, preferably, defining also a list of optional values for each cognitive property, and definitions of cognitive properties and their potential values, providing a repository of electronic memory, in which to save objects (text files, pictures, sound files, etc. . . . ), providing at least one object, preferably an electronic file, and attributing for the object, a value to each cognitive property in the list, thereby creating a list of cognitive elements for the object. A cognitive element is hereby defined as an amount of information in the format: 'cognitive property=value', for example, 'language=English'. When a given cognitive property is not to be defined for a particular object, this object may receive the cognitive element 'cognitive property=undefined'. The method further includes attaching the list of cognitive elements to the object, saving the object into the database, and generating a list of MI-elements for the object, and attaching the MI-list to the object. These MI-elements may comprise an automatically compiled list of words in a (text) object, to be used in a classic key word search.

Optionally, the method may comprise the step of manually making a list of key words for a particular object, and adding these key words in the form of MI-elements to the object in the database.

Another embodiment relates to computer software for configuring such a database and for adding objects to the database, by performing the above described method. This software will provide suitable user interfaces, which allow the selection of an initial object group, the definition of the list of cognitive properties of the database, the designation of values to these cognitive properties for each object, the creation of key words. Examples of such interfaces are described in the following.

Figure 3:
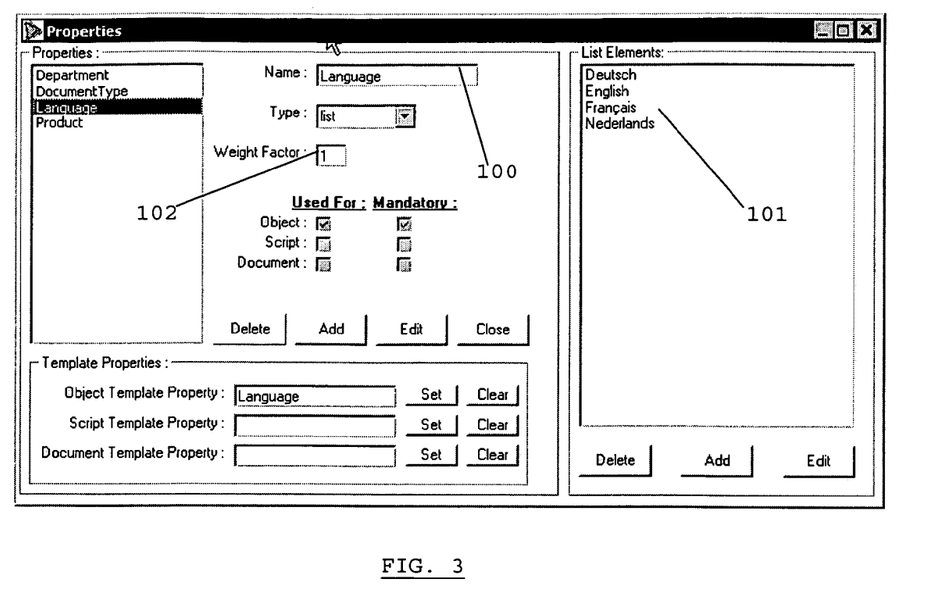
FIG. 3 represents an example of an interface for configuring a storage system.

FIG. 3 shows a user interface which allows to define properties by typing in a cognitive property name in the field 100. For each property, a list of values 101 can be defined. A weight factor 102 can be attributed to a given property, which is explained in connection with the search and retrieve options later in the this description.

Figure 4A:
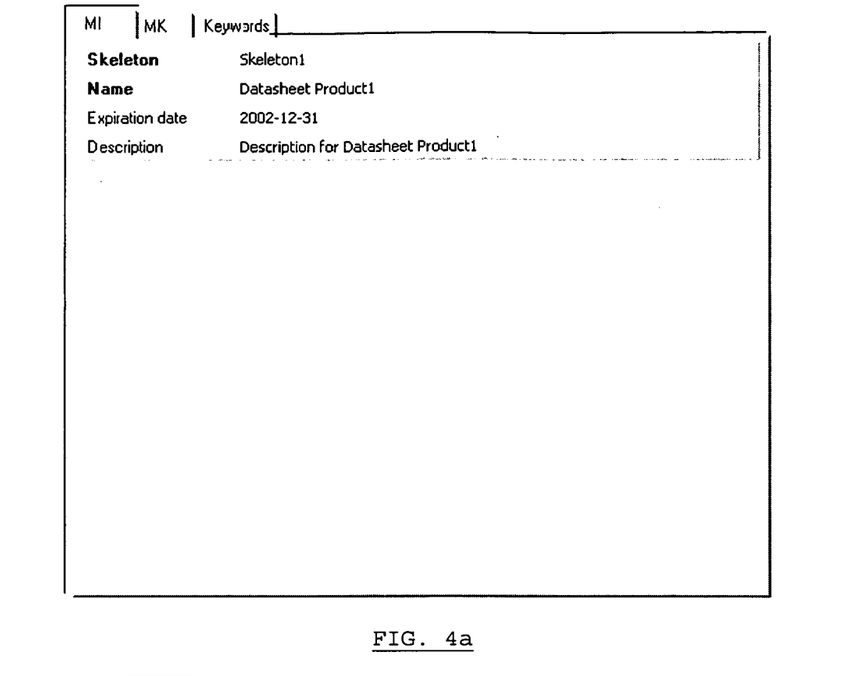
FIGS. 4a to 4c represents an example of a user interface used for adding objects to a storage system.
Figure 4B:
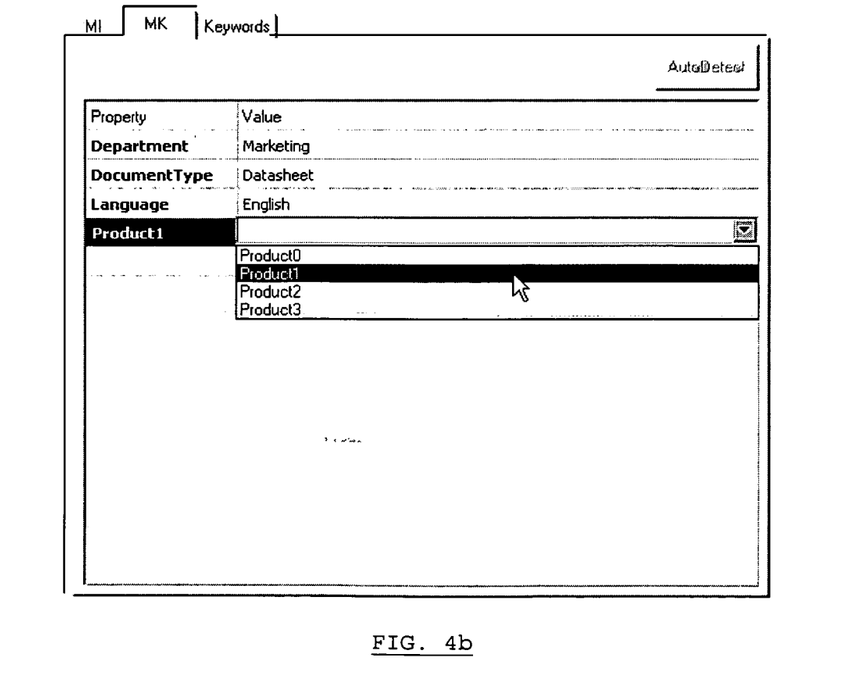
Figure 4C:
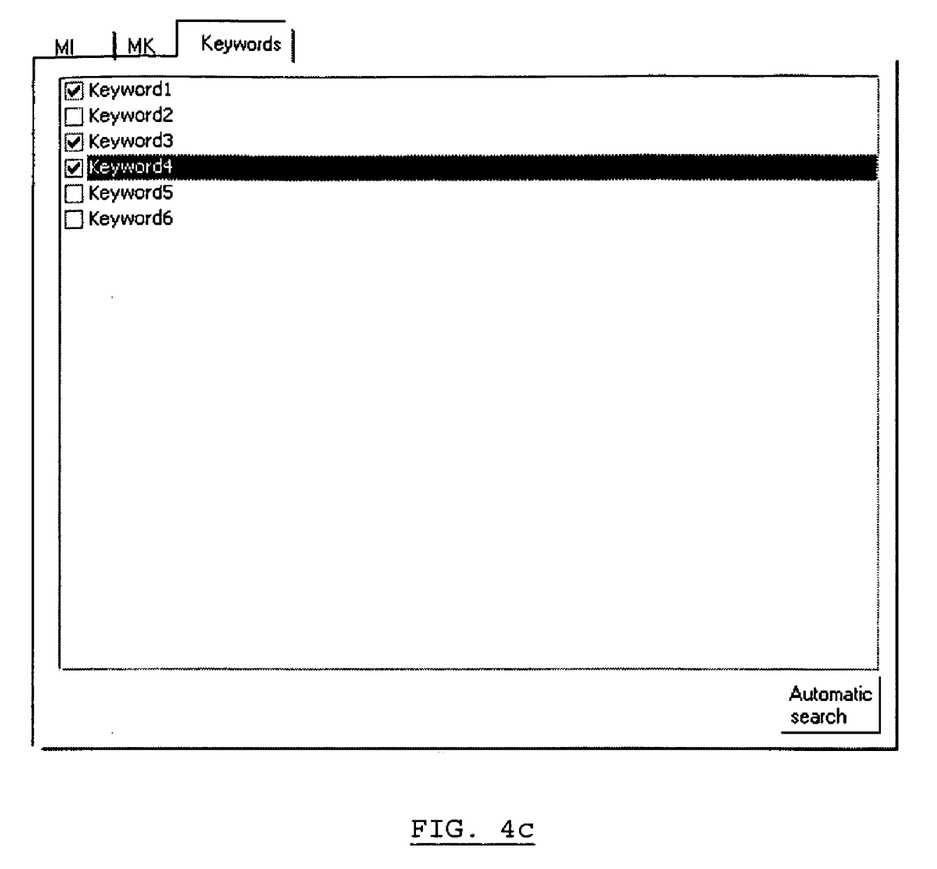

FIG. 4 shows in particular the user interface which is used to attribute cognitive elements to a selected object. The first page ('MI', see FIG. 4a) gathers general info on a particular object, such as the object name, the type, the expiration date, etc. These represent most of the MI-lables of a particular object. These elements are preferably created by the computer application itself. They may however be entered or modified on this page by the user. One particular element which is defined here is the 'skeleton'. This is actually a cognitive property, since it is preferably assigned by the user. It is a useful parameter, which refers to a pre-defined group of cognitive properties. Attributing a skeleton name to an object automatically defines a list of cognitive properties for which values have to be entered for this particular object.

On the second page of the interface ('MK', see FIG. 4b), the user may enter a number of values for the cognitive properties belonging to the specific skeleton, thereby creating cognitive elements. The values attributed to the different cognitive properties may be defined at this moment by the user. In the preferred case however, they are selected from a previously defined list, by the use of pop-up lists 6.

In the case shown, a third page is available (FIG. 4c), which allows the user to manually compile a list of relevant keywords, and add them to the object in the form of MI-labels.

The interfaces of FIG. 4 may be used for adding cognitive elements to a previously saved object, which was saved in the database with a number of MI-lables (at least the object name). It may equally be used immediately after creating the object, at which point the author may create all MI-elements and cognitive elements before saving the object in the database. In addition, it may be used to review all MI and MK elements attributed to a previously saved object, and possible alter these elements. Depending on the type of object, and specific capabilities of the software, some MI-elements may be attributed automatically, without having to be entered manually by the author (e.g. an automatically compiled key word list).

Another embodiment is related to a method for searching and retrieving information from a database created by the previously described methods. As stated above, this method is derived from the human thinking process which is used for recalling previously received information. In one embodiment, certain inventive aspects include selecting one or more cognitive properties of objects which are in the database, attributing a value to each of the cognitive properties which were selected, thereby defining a number of desired cognitive elements, receiving a group of documents, which have been enriched with all or a part of the desired cognitive elements.

The result of a search according to this method may appear in the form of a list of objects, which are all found to be enriched with all or a part of the desired cognitive elements. According to the preferred embodiment, relevance scores are attributed to every object in the result list, and they are ordered according to this score. The score is based on the number of desired cognitive elements with which the object is enriched, and preferably on a weight factor, attributed to the cognitive elements, prior to the search, and preferably upon creation of the cognitive property, such as shown in the interface of FIG. 3. For example, if the importance of finding documents about marketing is higher that the importance of finding English documents, the element 'type=marketing' may receive a higher weight than the element 'language=English'. The step of attributing weights to the cognitive elements precedes the steps previously described.

Figure 5:
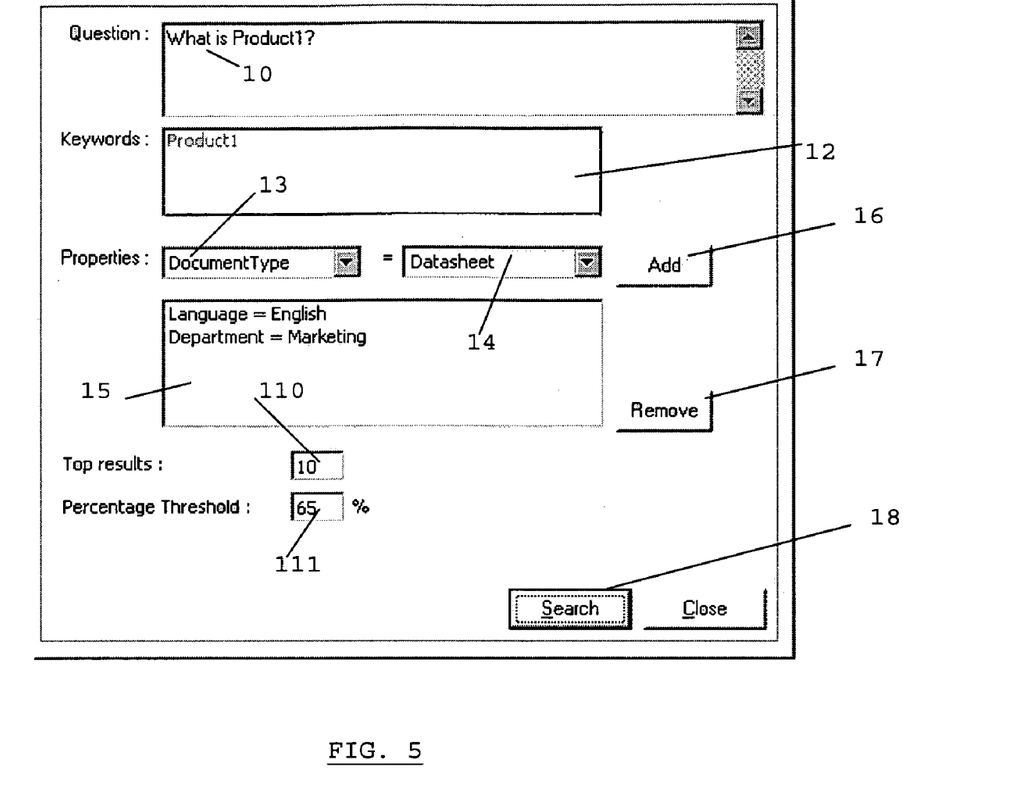
FIG. 5 represents an example of an interface used for searching information in a storage system, the search taking place according to the method described herein.

FIG. 5 shows an example of a user interface which allows a search, yielding a result list as described in the previous paragraph. Here, the search is based on a question 10 asked by the user. Keywords 12 are automatically derived from the question 10. Keywords may be deleted or added manually at this point.

Then, a number of cognitive properties are selected by the use of a first pop-up list 13, and values designated to these cognitive properties by a second pop-up list 14. Cognitive elements appear after this operation in the area 15. Elements can be added 16 or removed 17 from this area at will. They can be typed in as well as selected by the pop-up lists 13 and 14. The fields 110 and 111 allow to request for example only the top 10 results (field 110) and/or the results above a given percentage of desired cognitive properties (field 111). Once the list in area 15 is complete, the search command 18 may be given.

Figure 6:
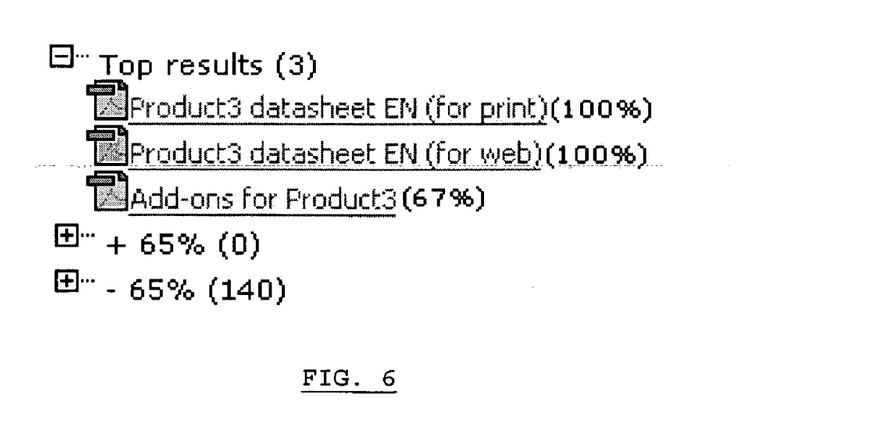
FIG. 6 represents an example of the result list of a search performed by one embodiment of the method described herein.

FIG. 6 shows an example of a result of such a search. The percentage indicated gives an idea of the relevance score, as described above. The score can be based on the number of desired cognitive properties attached to the objects in the list, possibly weighted by the weight factor attributed to each property.

Another embodiment is related to a method of representing (viewing) the contents of the database. This method is referred to here as 'cognitive view', and illustrated in FIGS. 7a and 7b. Cognitive view is designed to look like the classic tree structure, with the distinction that the structure is not pre-defined, but is dependent on the cognitive elements chosen. The structure provides therefore an overview of the complete database. Objects are grouped together based on common cognitive elements. For example, referring to FIG. 7a, the folder 20 regroups all objects in the database which possess the element 'department=marketing'. One can then go on to select another cognitive element, for example 'language=English' (folder 21), followed by 'product=product3' (folder 22), which produces a list of 4 documents 23, which have all of the desired cognitive elements. The order in which the cognitive elements are selected is wholly arbitrary, as illustrated by the alternative view shown in FIG. 7b. This allows the user to follow his own thinking process, and to see the representation of that process on the screen.

Figure 8:
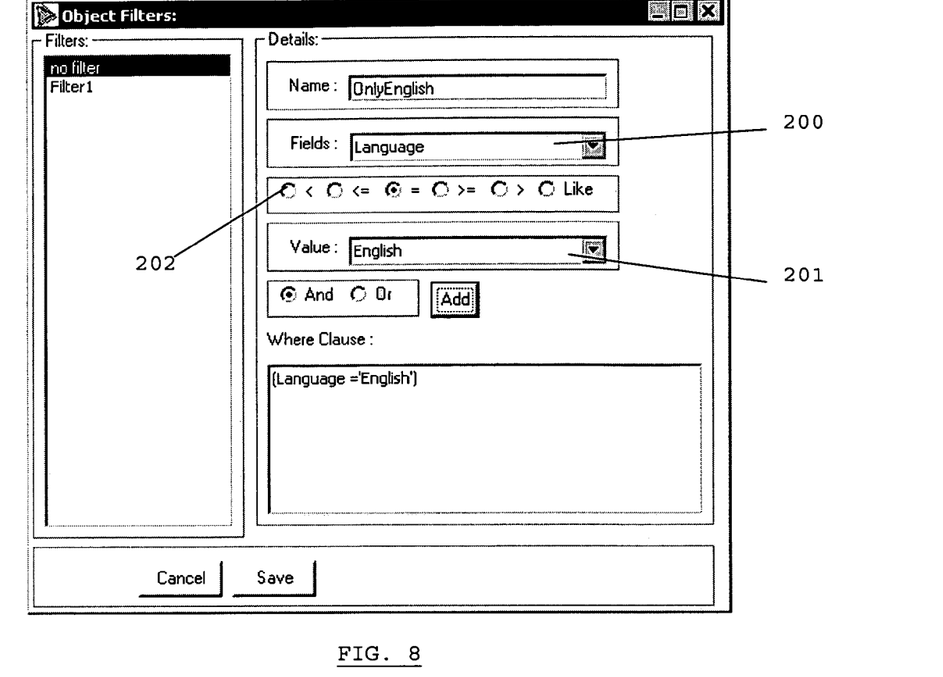
FIG. 8 represents an example of a user interface for applying a filter to a view.

A cognitive view may be refined by adding a 'cognitive filter' to it, see FIG. 8. This is the specification of for example a combination of a property 200 and a value 201, or several combinations of this sort. In a first embodiment, the view will then only show the cognitive element corresponding to this particular combination in the tree structure, and not the elements wherein the same property has a different value. This allows to quicken the search.

In a second embodiment, the view is even more restricted, in that only those cognitive elements are included in the view, which are attached to objects possessing the element which was specified in the filter. For example, if in FIG. 7b, the element 'product=product2' is only attached to objects in another language than English, the application of the filter of FIG. 8 will cause the element 'product=product2' not to appear in the view.

The element or elements specified in the filter may be cognitive elements, or MI elements, for example keywords.

In particular, when MI-elements are used as the basis of a filter, the arithmetic operators 202 of the filter interface of FIG. 8 may be useful. They allow for example to exclude all objects having a memory size higher than a given value, from the cognitive view, or to be more exact, they allow to exclude from the view all MK-elements attached to such objects.

Figure 9:
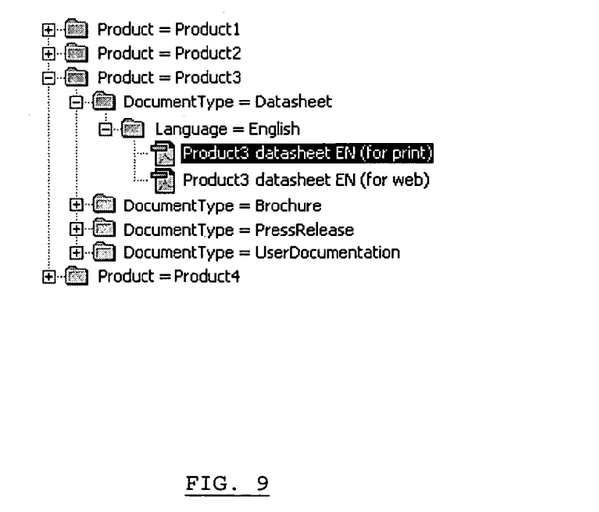
FIG. 9 represents one embodiment of the view of a filtered search.

A tree structure obtained, after applying the filter of FIG. 8, is shown in FIG. 9. It comprises only the element 'Language=English'.

It is pointed out that representing the objects in the database with 'cognitive view', uses all the steps of the method for searching information, described earlier. Cognitive view is therefore also a practical application of this general search method.

The software for applying cognitive view, needs to provide a user interface, allowing to create different tree structures on the screen. For example, in the case of FIG. 7a, the user will start by requesting a list of all the cognitive elements in the database of the type 'department= . . . '. Four elements are found, and listed:

Department=Administration
Department=Marketing
Department=Sales
Department=R&D

Figure 7A:
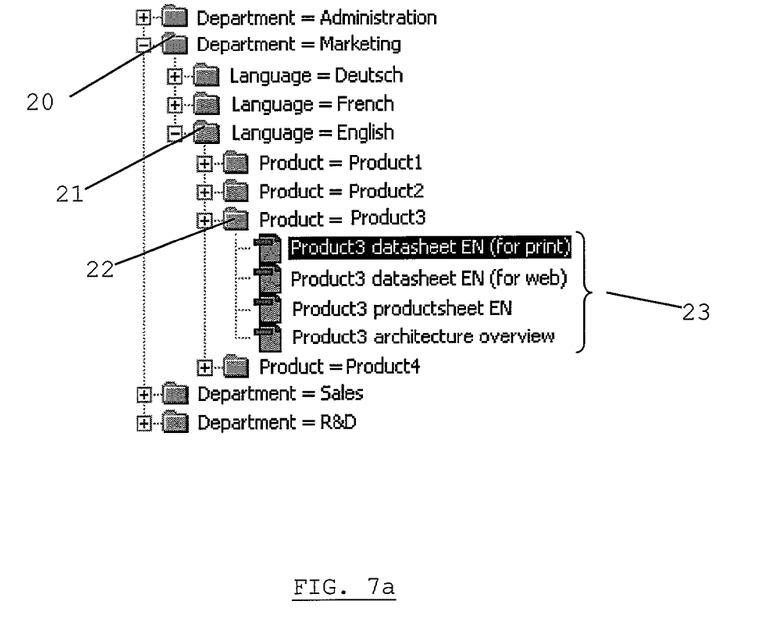
FIGS. 7a and 7b illustrates one embodiment for viewing the documents in a storage system created by the method described herein.
Figure 7B:
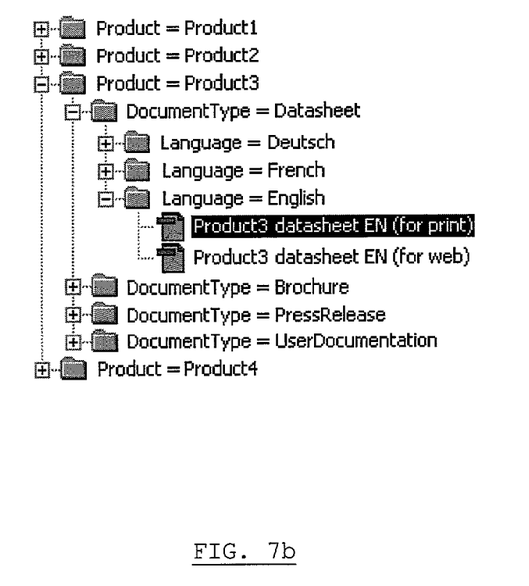

As a next step, the user asks for a listing of the elements of type 'language= . . . ', in combination with the element 'department=marketing'. Under 'language=English', the elements 'product= . . . ' are requested. Finally, 2 objects under 'product=product3' are assembled. Each of these objects possesses the previously requested cognitive elements. During the creation of the view, suitable interfaces must be available, allowing the user to define the subsequent cognitive elements which he wants to include, and to define at which point he wants to receive a list of objects. The filter is preferably defined and applied before launching the cognitive view.

A method is also provided for 'surveying' a database as described. This method comprises the step of identifying one or more cognitive elements or MI-elements (for example key words), and receiving regular listings of new documents which have entered the database and which possess all or a part of the specified cognitive elements. This method is merely a repetition at given intervals of the one-time search of documents described above (FIG. 5).

According to a slight variant of the embodiment of FIG. 5, a 'cognitive neighbor' search may be performed. Here, the user identifies a given document in the database, and launches the search. The system will retrieve the cognitive elements of the selected document and look for other documents which have the same cognitive elements, and rank them in order of correlation with the initially chosen document. The result is therefore a list with relevance scores as the one shown in FIG. 6.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. Many variations to the basic design are possible in other embodiments. The scope of the invention is indicated by the appended claims rather than by the foregoing description. All changes that come within the meaning and range of equivalency of the claims are to be embraced within their scope.

What is claimed is:

1. A computer-implemented method of searching, retrieving and representing objects, wherein objects include text files, pictures or video/audio files, comprising:
   providing a non-hierarchical database, the non-hierarchical database comprises a plurality of objects, each object is associated with one or more cognitive properties;
   searching the non-hierarchical database, comprising:
      selecting one or more cognitive properties;
      attributing a value to each of the cognitive properties which were selected, thereby defining a number of desired cognitive elements used to access the non-hierarchical database; and
   retrieving and representing objects, comprising:
      receiving one or more objects corresponding to the defined cognitive elements;
      creating a tree structure, wherein the tree structure represents the defined cognitive elements in a number of folders and subfolders, each folder and subfolder being related to one of the defined cognitive elements, wherein the tree structure is further refined by a filter that excludes one or more selected cognitive elements from the tree structure;
      assembling the received one or more objects to the folders and subfolders; and
      presenting the created tree structure.

2. A computer-readable medium comprising a program for performing a method for searching, retrieving and representing objects, wherein objects includes text files, pictures or video/audio files, comprising:
   providing a non-hierarchical database, the non-hierarchical database comprises a plurality of objects, each object is associated with a plurality of cognitive properties;
   searching the non-hierarchical database, comprising:
      selecting one or more cognitive properties;
      attributing a value to each of the cognitive properties which were selected, thereby defining a number of desired cognitive elements used to access the non-hierarchical database;
   retrieving and representing objects, comprising:
      receiving one or more objects corresponding to the defined cognitive elements;
      creating a tree structure, wherein the tree structure represents the defined cognitive elements in a plurality of folders and subfolders, each folder and subfolder being related to one of the defined cognitive elements, wherein the tree structure is further refined by a filter that excludes one or more selected cognitive elements from the tree structure;
      assembling the received one or more objects to the folders and subfolders; amid
      presenting the created tree structure.

3. The method of claim 1, wherein creating the tree structure comprises defining a point when the one or more objects are to be received.

4. The method of claim 1, wherein the number of desired cognitive elements which are to be included in the tree structure is defined via a user interface.

* * * * *

UNITED STATES PATENT AND TRADEMARK OFFICE
CERTIFICATE OF CORRECTION

PATENT NO.        : 7,209,914 B2
APPLICATION NO. : 10/154234
DATED             : April 24, 2007
INVENTOR(S)       : Hans Van Heghe et al.

Page 1 of 1

It is certified that error appears in the above-identified patent and that said Letters Patent is hereby corrected as shown below:

| Column | Line | Description of Error |
|--------|------|----------------------|
| 5 | 9 | Delete "defined" and insert -- defined: --, therefor. |
| 10 | 56 (Approx.) | In Claim 2, delete "amid" and insert -- and --, therefor. |

Signed and Sealed this

Twenty-second Day of December, 2009

David J. Kappos
*Director of the United States Patent and Trademark Office*